Aug. 27, 1935.  J. A. PERRY  2,012,793

BOLTED PIPE JOINT

Filed May 5, 1934

WITNESS:

Robt R Kitchel

INVENTOR

Joseph A. Perry

BY

Augustus B Stoughton

ATTORNEY.

Patented Aug. 27, 1935

2,012,793

UNITED STATES PATENT OFFICE 2,012,793

BOLTED PIPE JOINT

Joseph A. Perry, Swarthmore, Pa., assignor to The United Gas Improvement Company, Philadelphia, Pa., a corporation of Pennsylvania Application May 5, 1934, Serial No. 724,122

2 Claims. (Cl. 285—17)

The present invention relates to bolted pipe joints for underground metal piping.

It has been determined by tests under my direction that in underground metal piping subject to electrolytic corrosion and provided with bolted joints, the bolts and nuts, because of their position and surface exposure, tend to lose a disproportionate quantity of metal as compared with the remainder of the joint, and joints tend to fail by corrosion of the bolts and nuts when the remainder of the joint is in relatively good condition.

The principal object of the present invention is to provide inexpensive and readily applicable means for protecting the exposed ends of such bolt elements from such loss, thereby prolonging the life of the joint.

To this and other ends hereinafter set forth or appearing, the invention, generally stated, comprises caps housing and enclosing the end structures of the bolts and contacting at their rims with a face of the flange element of the joint and held to place by direct engagement of the caps with a part of the end structures of the bolts.

The invention also comprises the improvements to be presently described and finally claimed.

Figure 1:
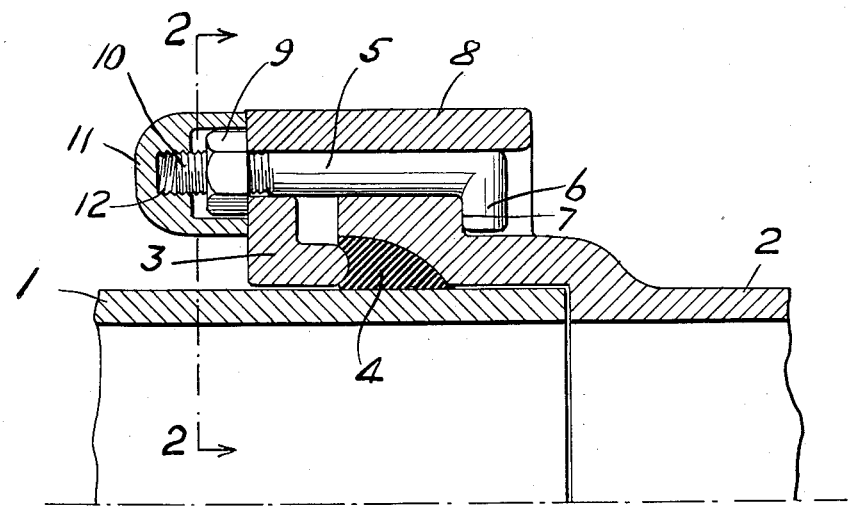
Figure 2:
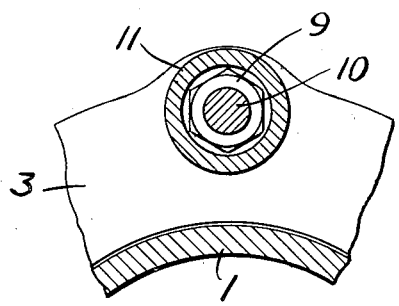

The invention will be described in connection with the attached drawing which forms a part of this specification and which shows a form of the invention chosen for illustration, and in which:

Figure 1 is a cross-sectional view of a portion of a bolted bell and spigot pipe joint, showing a form of the device of the present invention attached to the nut end of a bolt, and Figure 2 is a cross-sectional view along the line x—x of Figure 1.

Referring to the drawing: 1 indicates a portion of the spigot end of a pipe section. 2 indicates the bell end of an adjoining section. 3 is a follower ring which constitutes a flange element of a pipe joint. 4 is a rubber packing ring forced into the joint between the bell and spigot by the follower ring when the latter is drawn up by bolt elements. In the figures one bolt is indicated at 5, the head 6 of which engages the shoulder 7 on the bell. 8 is an extension of the follower ring, forming a protective sleeve around the shank and head of the bolt. 9 is a nut for drawing up the bolt. 10 indicates the threaded end of the bolt. A bolt end structure includes a squared or polygonal part attached to the shank of the bolt permanently or by a thread. 11 is a protective metal cap directly attached to a bolt element and enveloping the nut and threaded end of the bolt and contacting at its rim with the face of the flange element. In the form illustrated, the cap is provided with the recess 12 threaded to engage the threads on the end of the bolt. Obviously other methods of attaching the caps to bolt elements may be employed; for instance, they may be forced on over the nut and over the head of the bolt, if that is not protected by other means.

Current tending to leave the joint by way of the ends of the bolts or nuts leaves by way of the caps, carrying metal away from the caps instead of the bolt ends or nuts. The caps are made sufficiently heavy to provide for a considerable loss of metal while still providing protection.

These caps may be made and applied very cheaply, and very materially prolong the life of the joint.

Bolted leak clamps obviously present the same problems and suggest the same solutions, and a pipe to which a bolted leak clamp has been applied is considered a bolted joint.

It will be obvious to those skilled in the art to which the invention relates that modifications may be made in details of construction and arrangement in matters of mere form without departing from the spirit of the invention which is not limited in respect to such matters or otherwise than as the prior art and the appended claims may require.

I claim:

1. Means for resisting the electrolytic corrosion loss of metal from the bolt end structure of pipe joints, comprising the combination with a flange element of the joints and the bolt end structures, of metal caps housing the bolt end structures and detachable therefrom and contacting with the face of the flange element and held to place by direct engagement of the caps with the bolt end structures.

2. Means for resisting the electrolytic corrosion loss of metal from the bolt end structure of pipe joints, comprising the combination with a flange element of the joints and the bolt end structures, of metal caps housing the bolt end structures and detachable therefrom and held to place by direct engagement of the caps with the bolt end structures.

JOSEPH A. PERRY.